3,639,661
POLYMERIZATION OF ISOBUTYLENE
Miroslav Marek and Jan Pecka, Prague, Czechoslovakia, Miroslav Chmelíř, Mainz, Germany, and Milena Roosova, Vienna, Austria, assignors to Ceskoslovenska Akademie Ved, Prague, Czechoslovakia
No Drawing. Filed Jan. 21, 1969, Ser. No. 803,519
Int. Cl. C08d 3/04
U.S. Cl. 260—94.8                        9 Claims

ABSTRACT OF THE DISCLOSURE

The polymerization of isobutylene is readily controlled to produce a polymer of high molecular weight in the presence of a catalyst which is either a reaction product of titanium tetrafluoride with a chlorine bearing Friedel-Crafts catalyst soluble in isobutylene or a reaction product of titanium tetrachloride or boron trichloride with a fluorine bearing compound whose fluorine atoms are capable of partly replacing chlorine atoms in the titanium tetrachloride or boron trichloride.

---

This invention relates to the polymerization of olefins, and particularly to the polymerization of isobutylene in the presence of a Friedel-Crafts catalyst.

The Friedel-Crafts catalysts most frequently employed heretofore on an industrial scale are aluminum chloride and boron trifluoride. The polymerization rate achieved in the presence of these two catalysts, however, is so high that the polymerization mixture must contain substantial amounts of diluents if the temperature of the mixture is to be held within limits consistent with the formation of a polymer of the normally desired high molecular weight, that is, below 0° C.

Other known Friedel-Crafts catalysts, such as titanium tetrachloride or tin tetrachloride have a catalystic activity too low to permit their use on an industrial scale. The highest molecular weight of the polymer that can be achieved by means of these less active catalysts is too low for practical applications.

We have now found that polyisobutylene of desirable high molecular weight can be produced in a liquid medium under readily controlled conditions and at relatively high temperatures from isobutylene in the presence of catalysts which are products of the reaction between titanium tetrafluoride and a chlorine-bearing Friedel-Crafts catalyst soluble in isobutylene and n-heptane, such as titanium tetrachloride, tin tetrachloride, or boron trichloride, or of the reaction between titanium tetrachloride or boron trichloride with a fluorine bearing compound whose fluorine atoms are capable of replacing chlorine atoms in the titanium or boron chloride but are present in an amount too small to replace all chlorine atoms. Suitable fluorides include, but are not limited to anhydrous hydrogen fluoride, boron trifluoride, tert-butyl fluoride, benzyl fluoride, and such inorganic fluorides as potassium fluoride.

The catalytic activity of these reaction products is so high as to cause the polymerization to proceed rapidly, but to be normally terminated before the entire monomer supply is exhausted. The ultimate degree of conversion is directly related to the amount of catalyst provided, and 100% conversion can be achieved, if desired, by gradually adding the catalyst to the polymerization mixture in small doses. The polymerization rate is controlled conveniently by controlling the rate at which the catalyst is added. The control achieved is so precise that isobutylene may be polymerized by the method of this invention without any solvent or diluent being present in the polymerization mixture and without complex cooling equipment.

When titanium tetrachloride is one of the reactants employed in preparing the catalyst, the entire required amount of $TiCl_4$ may be admixed to the isobutylene, and titanium fluoride may then be added at a rate necessary to maintain the desired polymerization conditions, particularly the polymerization temperature, with the available cooling, for example, air cooling of the reaction vessel or heat transfer from the vessel to a cooling bath.

When the fluoride-bearing compound employed in conjunction with titanium tetrachloride is an alkyl fluoride or hydrogen fluoride which do not have significant catalytic effects by themselves, either of the two reactants may be admixed to the isobutylene, and the polymerization rate and degree of conversion are controlled by the rate of addition and the total added amount of the second reactant. The reactants, of course, may be mixed separately from the isobutylene to produce the desired reaction, and the mixture may then be added to the isobutylene under polymerization conditions, usually in small doses distributed over the polymerization period.

When $TiCl_4$ and $TiF_4$ are mixed in a neutral medium such as n-heptane in which $TiCl_4$ is soluble and $TiF_4$ can be suspended, a yellowish-white precipitate having high catalytic activity is formed if the ratio of $TiCl_4$ to $TiF_4$ is not less than 1:4. With smaller amounts of $TiCl_4$ a white product devoid of practical catalytic activity is formed. $TiCl_4$–$TiF_4$ catalysts in which the ratio of the two components is between 2:1 and 1:1 normally are preferred.

The catalysts of the invention are effective also if the isobutylene is contaminated with considerable amounts of other unsaturated hydrocarbons, as in the waste material obtained after butadiene is recovered from a $C_4$ petroleum fraction. Polyisobutylene having a molecular weight as high as 100,000 has been prepared from such material by the method of the invention, and straight-chained hydrocarbons were recovered unchanged for later hydrogenation. The catalysts of the invention are generally liquid under hydrogenation conditions and do not cause chlorination of the hydrocarbons, as would occur, for example, with aluminum chloride catalysts.

All available evidence indicates, that the titanium bearing catalysts of the invention are compounds of the Formula $TiCl_xF_y$, wherein $x+y=4$, and each of $x$ and $y$ is substantially greater than zero. The titanium fluochlorides of the invention appear to be strong Lewis acids which are capable of initiating cationic polymerization. $TiF_4$ has no catalytic effect, and $TiCl_4$ must not be reacted with an excess of alkyl fluoride sufficient to remove all chlorine from the titanium. The titanium fluochlorides of the invention can be formed not only by replacing chlorine by fluorine in $TiCl_4$, but also by replacing fluorine by chlorine in $TiF_4$, for example by means of $SnCl_4$ or $BCl_3$. The corresponding fluorochlorides of boron of the Formula $BCl_aF_b$ in which $a+b=3$, and each of $a$ and $b$ is considerably greater than zero, are similarly effective catalysts. When $BCl_3$ is mixed with $TiF_4$ effective fluorochlorides of both boron and titanium appear to be formed.

The catalysts of the invention permit polyisobutylene of high molecular weight to be formed at temperatures much higher than were heretofore customary, more specifically, above 0° C. The polymers prepared according to the method of the invention have molecular weights which are much higher than those achieved under otherwise comparable conditions with conventional Friedel-Crafts catalysts.

The catalysts of the invention are effective in extremely small amounts, particularly when produced in situ, that is by a reaction between $TiCl_4$ and an alkyl fluoride, or one of the other reactions mentioned above, within the polymerization mixture and under polymerization conditions.

The catalyst consumption is of the order of a few hundredths of one percent, or even less, based on the weight of the polymer formed. The catalyst thus need not be removed from the polymer for many applications of the latter, such as in lubricant additives, paper coatings and impregnants, and the like.

The following examples are further illustrative of the instant invention, and it should be understood that the invention is not limited to the examples.

EXAMPLE 1

372 g. isobutylene were confined in a vessel at 20° C. at a pressure high enough to keep the isobutylene liquid. Titanium tetrafluoride was purified by sublimation. The isobutylene in the vessel was mixed with 56 mg. $TiCl_4$ dissolved in a minute amount of n-heptane, and a suspension of 60 mg. freshly sublimated $TiF_4$ in a similar amount of n-heptane was added in five, approximately equal batches at intervals chosen to keep the temperature of the air-cooled vessel between 20° C. and 27° C.

When the polymerization had been completed, 290 g. polyisobutylene having a moleclular weight of 49,600 were recovered from the polymerization mixture. Molecular weights, as reported in these examples, were calculated from viscosity determinations.

EXAMPLE 2

Gaseous anhydrous hydrogen fluoride was dispersed in a continuous stream in a 2% solution of titanium tetrachloride in n-heptane at 20° C., whereby a precipitate was formed.

The precipitate was recovered by filtration, washed three times with dry heptane, and dried at 50° C. in a vacuum to remove not only the solvent, but also, and more important, adsorbed hydrogen chloride. The purified product was dispersed in freshly distilled, anhydrous heptane and mixed with 10% titanium tetrachloride, based on the weight of the solid fluoridation product.

The catalyst so obtained was added to a 10 percent solution of isobutylene in n-heptane at −10° C. with agitation and external cooling over a period of one hour in three batches, each containing 0.1% solids based on the weight of the isobutylene in the reaction mixture, and spaced apart to maintain the polymerization temperature. When the polymerization was stopped, the conversion was 83%, and the molecular weight of the polymer was 155,000.

EXAMPLE 3

Titanium tetrafluoride was freshly sublimated and then dispersed in heptane by grinding. Enough boron trichloride was added to make the molar ratio of titanium to boron in the suspension 4:1. An amount of the suspension containing 0.06 g. titanium tetrafluoride was added with continuous agitation and cooling to 40 ml. of a 10% solution of isobutylene in n-heptane at −10° C.

When the polymerization was terminated after 20 minutes, the conversion rate was 30%, and the molecular weight of the polymer recovered was 220,000.

When tin tetrachloride was substituted for the boron trichloride under otherwise identical conditions, a 40% conversion of the monomer to the polymer was achieved within 30 minutes, and the molecular weight of the polymer was 60,000.

EXAMPLE 4

30 g. liquid isobutylene in a pressure vessel were mixed with a solution of $10^{-5}$ mole titanium tetrachloride in a minimal amount of heptane, the mixture was cooled to −50° to −45° C., and $3\times10^{-6}$ mole tert-butyl fluoride dissolved in a little heptane was added to the mixture repeatedly at intervals sufficient to maintain the above temperature with the available cooling bath. When approximately one gram-atom fluorine had been added for each gram-atom titanium originally present, further $5\times10^{-6}$ mole titanium tetrachloride was added, and the addition of alkyl fluoride were resumed. This procedure was repeated once more until the overall consumption of catalyst reactants was $2\times10^{-5}$ $TiCl_4$ and $2.5\times10^{-5}$ tert-butyl chloride.

40% isobutylene was converted to the polymer which had a molecular weight of 550,000.

When the above procedure was repeated with benzylfluoride instead of the tert-butyl fluoride at a polymerization temperature of −20° to −15° C., the polymerization had to be terminated at 50% conversion because of the increasing viscosity of the mixture. The polymer recovered had a molecular weight of 224,000.

When 3% isoprene were added to the isobutylene and the polymerization was carried out at −50° to −45° C. in the presence of the reaction product of $TiCl_4$ and tert-butyl fluoride, as described above, a copolymer having a molecular weight of 84,000 was obtained at a conversion rate of 30%.

EXAMPLE 5

Potassium fluoride was finely ground and thoroughly dried at 150° C. for 24 hours in a vacuum of 20 mm. Hg 0.5 g. KF were dispersed in 1 ml. of a 10% solution of $TiCl_4$ in n-heptane. The dispersion was added to 300 ml. of a 10% isopropylene solution in n-heptane at 0° C., and this temperature was maintained for 24 hours. 0.9 g. polyisobutylene having a molecular weight of 11,000 was recovered from the polymerization mixture.

EXAMPLE 6

A solution of $1.2\times10^{-4}$ mole benzyl fluoride in 3 ml. heptane was admixed to 24 g. liquid isobutylene at −15° C. $10^{-4}$ mole boron trichloride was then added to the mixture in several small batches to avoid an undue temperature rise. After the boron trichloride addition had been completed, a second addition of $1.0\times10^{-4}$ mole benzyl fluoride was made, and the reaction mixture was removed from the cooling bath shortly thereafter.

Unreacted monomer was removed by distillation, and 14.7 g. polyisobutylene having a molecular weight of 123,000 were recovered. No polymer whatsoever was obtained when either the benzyl fluoride or the boron trichloride were omitted. The two reactants, when used singly in the amounts and under the polymerization conditions described, have no significant catalytic activity.

EXAMPLE 7

Boron trifluoride was introduced into a dilute heptane solution of titanium tetrachloride until the $TiCl_4$ concentration in the liquid phase was reduced to 0.015 mole per liter, and a solid was precipitated which was mechanically suspended in the liquid. 2 ml. of the suspension were added to 36 ml. of a 10% isobutylene solution in n-heptane at −15° C. The polymerization proceeded isothermally during 30 minutes whereby 43% of the monomer were converted to isobutylene having a molecular weight of 100,000.

EXAMPLE 8

The $C_4$ fraction obtained by rectifying a thermal cracking product of petroleum was stripped of most dienes present and thoroughly washed with water. When redistilled, it contained the following identified components:

| | |
|---|---|
| Isobutylene, (percent) | 46 |
| 1-butene | 24 |
| 2-butene (cis and trans) | 14 |

It also container n-butane, isobutyne, about 0.5% dienes, and traces of water, acetylene, and nitrogen-bearing compounds.

60.5 g. purified C-4 fraction were cooled to −25° C. and 0.1 g. tert-butyl fluoride were added. Ten batches of a heptane solution of $TiCl_4$ were then admixed at intervals to maintain an average temperature of −17° C. until 0.09 g. $TiCl_4$ had been consumed. The polymer recovered weighed 16.0 g. and had a molecular weight of 42,000.

EXAMPLE 9

$10^{-5}$ mole $TiCl_4$ was added at $-10°$ C. to 20 g. of the purified $C_4$ fraction described in Example 8, and gaseous anhydrous hydrogen fluoride was introduced into the polymerization mixture at a rate to keep the temperature of the mixture at $-10°$ to $-7°$ C. The procedure of Example 4 was used to achieve 100% conversion of the isobutylene present to polyisobutylene. The overall consumption of catalyst reactants amounted to $5 \times 10^{-5}$ mole titanium tetrachloride and $6 \times 10^{-5}$ mole hydrogen fluoride. The molecular weight of the recovered polymer was 26,000.

What is claimed is:

1. A method of polymerizing isobutylene which comprises holding said isobutylene in a liquid medium under polymerization conditions in the presence of a catalytic amount of the product of a first reaction between two reactants, one reactant being titanium tetrafluoride and the other reactant being a chlorine-bearing Friedel-Crafts catalyst, the amount of said catalyst being insufficient to replace all of said fluoride in said titanium tetrafluoride, soluble in said medium, or of a second reaction between two reactants, one of the reactants in said second reaction being titanium tetrachloride or boron trichloride, and the other reactant in said second reaction being a compound bearing fluorine atoms capable of replacing chlorine atoms in said titanium tetrachloride or boron trichloride, said compound being anhydrous hydrogen fluoride, boron trifluoride, tert-butyl fluoride, or benzyl fluoride, the amount of said other reactant in said second reaction being insufficient to replace all chlorine atoms in said titanium tetrachloride or said boron trichloride by fluorine, until a polymer of said isobutylene is formed.

2. A method as set forth in claim 1, wherein said isobutylene is held under said conditions in the presence of a product of said first reaction, said Friedel-Crafts catalyst being titanium tetrachloride, tin tetrachloride, or boron trichloride.

3. A method as set forth in claim 1, wherein said first reaction or said second reaction is performed in the presence of said isobutylene under said conditions.

4. A method as set forth in claim 3, wherein said first reaction or said second reaction is performed by admixing one of the respective reactants to said isobutylene and thereafter adding the other reactant to the resulting mixture at a rate sufficient to maintain said polymerization conditions.

5. A method as set forth in claim 1, wherein said first reaction or said second reaction is performed by mixing the respective reactants, the resulting mixture being added to said isobutylene under said conditions.

6. A method as set forth in claim 5, wherein said mixture is added to said isobutylene at a rate sufficient to maintain said polymerization conditions.

7. A procedure of claim 1, wherein the catalyst is a product having the ratio of $TiF_4$ to a soluble, chlorine containing Friedel-Crafts halide 0.1:1 to 20:1.

8. A procedure of claim 1, wherein the catalyst is a compound having the ratio of $TiCl_4$ to a fluorinated ion 0.1:1 to 20:1.

9. A procedure of claim 1, wherein the catalyst is a product having the ratio of $BCl_3$ to a fluorinated ion 0.1:1 to 20:1.

References Cited

UNITED STATES PATENTS 2,931,791  4/1960  Ernst et al. _____ 260—85.3
3,057,837  10/1962  Calfee _____ 260—93.7

OTHER REFERENCES

Olan "Friedel-Crafts and Related Reactions," (1963) Interscience Publishers, New York, N.Y. (pp. 262–263).

JOSEPH L. SCHOFEE, Primary Examiner

R. A. GAITHER, Assistant Examiner